United States Patent [19]

Weng et al.

[11] Patent Number: 5,325,286
[45] Date of Patent: Jun. 28, 1994

[54] MICRO-COMPUTER OPERATED CONTROL DEVICE FOR AIR-CONDITIONING SYSTEM

[75] Inventors: Kuo-Liang Weng; Kuo-Lianq Weng, both of Taichung, Taiwan

[73] Assignee: Yu Feng Enterprise Co., Ltd., Taichung, Taiwan

[21] Appl. No.: 942,893

[22] Filed: Sep. 10, 1992

[51] Int. Cl.$^5$ .................... G06F 13/12; G05B 11/01
[52] U.S. Cl. .................... 364/141; 364/146; 364/557; 236/1 B; 236/1 C
[58] Field of Search .............. 364/141, 146, 550, 551; 236/1 B, 1 C; 62/132, 157, 159

[56] References Cited

U.S. PATENT DOCUMENTS

| | | | |
|---|---|---|---|
| 4,916,642 | 4/1990 | Kaiser et al. | 364/550 |
| 4,967,382 | 10/1990 | Hall | 364/557 |
| 4,977,310 | 12/1990 | Studer et al. | 235/375 |
| 5,103,391 | 4/1992 | Barrett | 364/133 |

*Primary Examiner*—Jerry Smith
*Assistant Examiner*—Paul Gordon
*Attorney, Agent, or Firm*—Browdy and Neimark

[57] ABSTRACT

An improved micro-computer operated control device for an air conditioning system which is specially characterized in that the air volume produced by the air conditioning system can be automatically varied in correspondence to the temperature of a closed space is disclosed. A number of temperature sensing components are constantly monitored by a processing unit of the temperature data thereof which are compared with predefined temperatures provided by a function setting unit; the results of the comparisons are transformed into corresponding signals which are then transmitted to an output control unit; and a voltage regulator is actuated in accordance to the signals to adjust the voltage of the motor of a fan supplied by a power source so that the operation speed of the fan can be constantly varied in correspondence to the external temperatures, resulting in the air volume delivered by the fan varied accordingly. The constant variation of the air volume delivered by a fan and the on-off control of the heating or cooling source can thus enable an air conditioning system to smartly provide proper volume of hot air or cool air to a closed space according to the continual variation of the external temperature.

2 Claims, 10 Drawing Sheets

MICRO-COMPUTER OPERATED CONTROL DEVICE FOR AIR-CONDITIONING SYSTEM

BACKGROUND OF THE INVENTION

The present invention relates to an improved micro-computer operated control device for an air conditioning system which is capable of provision of varied air volume by a fan the operation speed of which can be controllably changed by way of adjustment of the voltage of the motor of the fan. The present invention is equipped with a number of temperature sensing components, a processing unit, a function setting unit, an output control unit and a power supply unit. When the air conditioning system of the present invention is started to operate, the processing unit begins to constantly make comparisons of the temperatures obtained from the temperature sensing components with those predefined temperatures in the function setting unit; and the results of the comparisons are transformed into corresponding control signals which are transmitted to the output control unit so as to make the voltage regulator thereof respond according to the control signals to vary the supplied voltage of the motor of a fan, resulting in the variation of the operation speed of the fan whereby the air volume delivered by the fan can be accordingly altered in response to the external environment constantly.

Generally, the prior art fan 15 in a conventional micro-computer controlled air conditioning system is controlled by a CPU which can constantly make comparisons of the external temperature related values with the predefined temperatures therein so as to be able to vary the operation speed of a 3-stage motor 151 of the fan 15 accordingly along with the heat or cool supplied by the air conditioning system simultaneously altered in accordance to the results of the comparisons. As shown in FIG. 2, the control of the supply of heat or cool is effected by way of a microcomputer controlled device in operation panel 25, supplied by D.C. power source 24, and fed to control circuit 22 through delivering circuit 23 having a control terminal 221 which is used to control, as shown in FIG. 1 a refrigerator 11 or a boiler 12 to start or stop functioning; and another control terminal 222 is used to control the opening and closing of a valve 14 so as to effect the variation of the supply of heat or cool to a closed space.

This kind of prior art can only vary the operation speed of the 3-stage motor 151 by way of the control terminals 223-225 and 226 through electrical operated three passage or two passage valve 26; the motor operating only at 3 different speeds can not vary the air volume supplied by the fan 15 linearly in correspondence to the external temperature changes from temperature sensors 20 through analog to digital converter 21 to delivering circuit 23. As shown in FIG. 3, in the three stages (indicated by a-b, b-c, c-d), the 3-stage motor 151 can operate only at a fixed speed Fs. Therefore, in each stage, the fan supplies a constant volume of air without any response to the external variation in temperature in a closed space 10, often making the closed space 10 too cold or hot for people to stay therein with comfort.

SUMMARY OF THE INVENTION

The primary object of the present invention is to provide an improved micro-computer operated control device for an air conditioning system equipped with a motor which can be varied of its voltage according to the external temperature information processed by the CPU of the micro-computer so as to stagelessly vary the operation speed of a fan, resulting in the continuous variation of the air volume supplied accordingly.

Another object of the present invention is to provide an improved micro-computer operated control device for an air conditioning system which can automatically cut off the heating or cooling source when the external temperature comes above or below a predefined temperature; in the cooling process, the fan will also be stopped as the external temperature drops below a certain temperature which is harmful to the health of people; in the heating process, the fan will be kept operating at a low speed to make the air in a closed space circulate when the heating source of the system is cut off as a result of the external temperature coming above a predefined temperature so as to economize the energy consumption thereof.

DETAILED DESCRIPTION OF THE PREFERRED EMBODIMENTS

Figure 1:
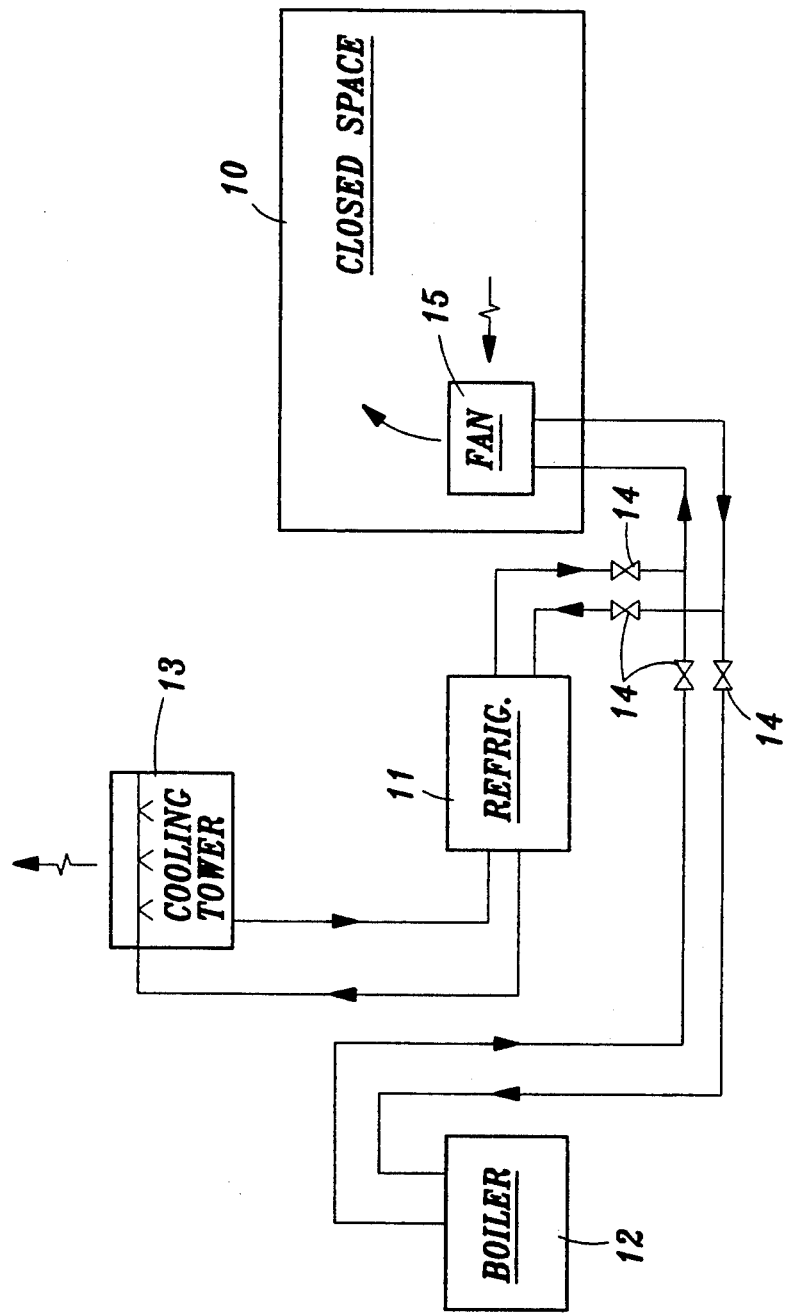
FIG. 1 is a simple structure of a prior art air conditioning system.
Figure 2:
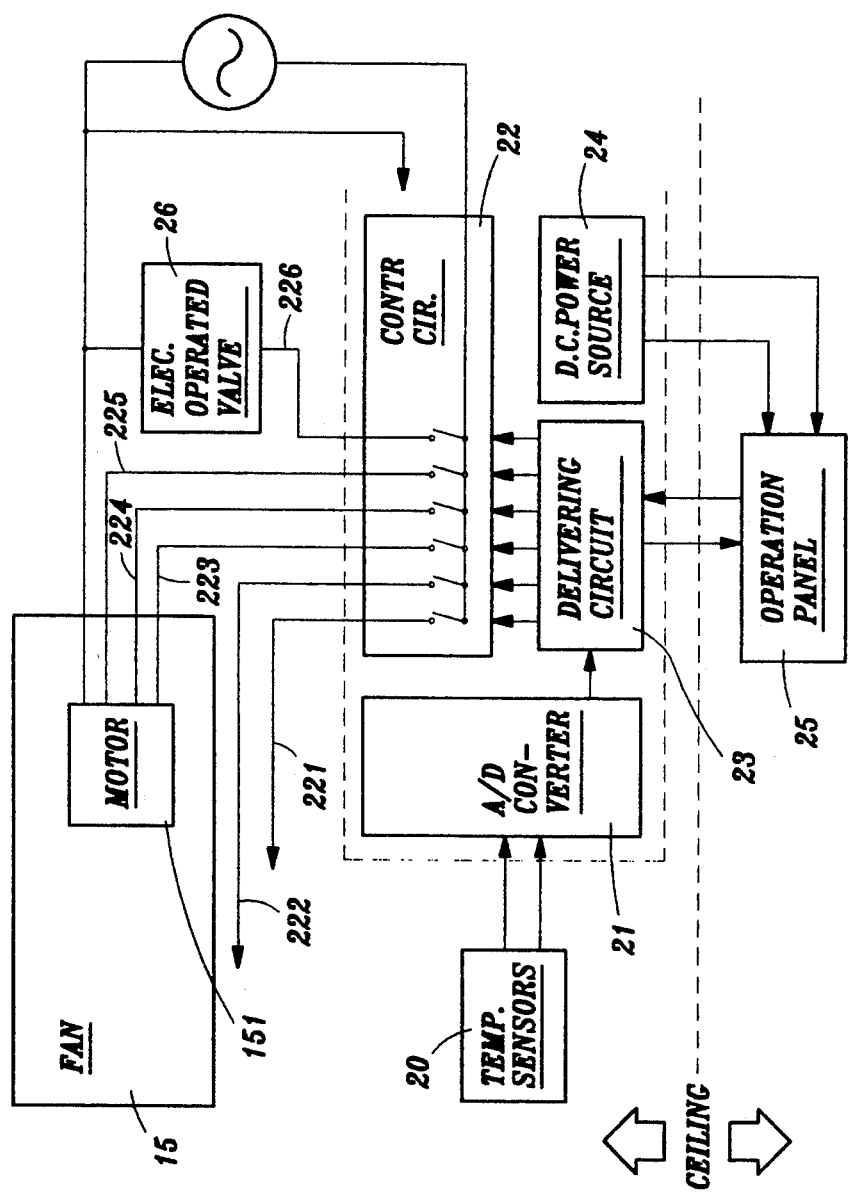
FIG. 2 is a diagram showing a prior art micro-computer controlled air conditioning system.
Figure 3:
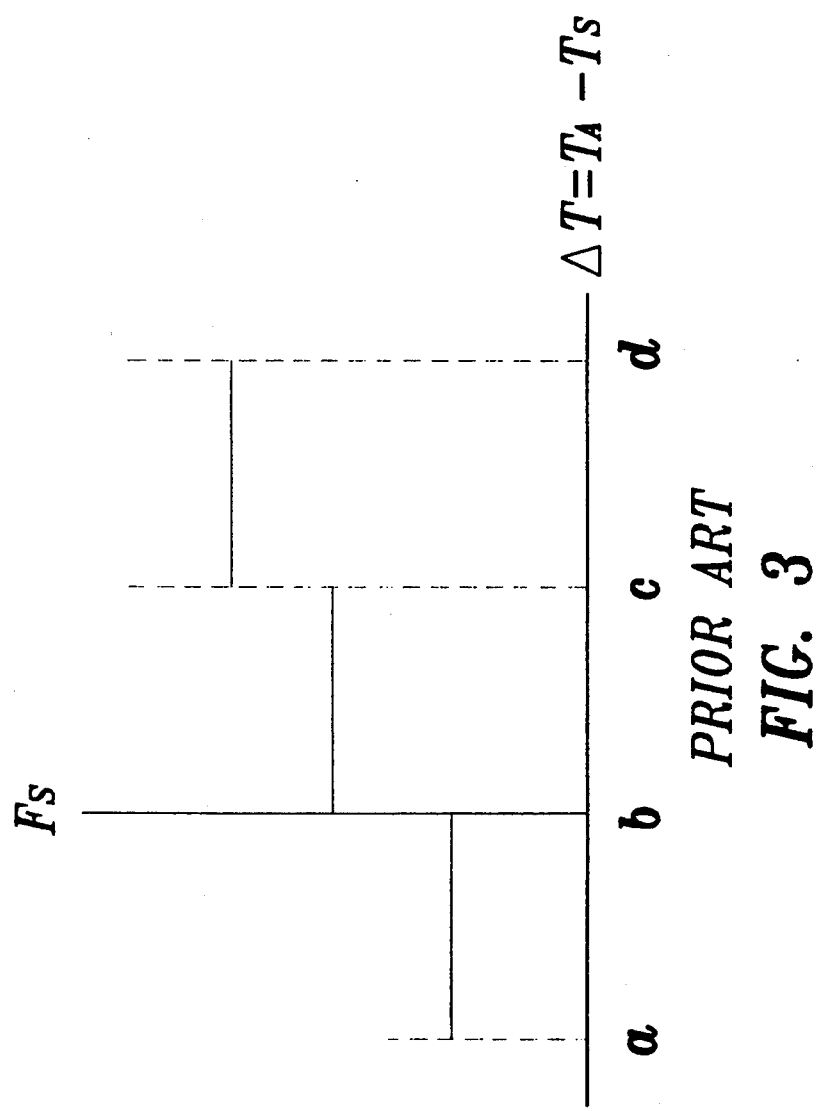
FIG. 3 is a diagram showing the relation of the operation speed Fs of a 3-stage motor of the prior art air conditioning system with respect to temperature variations T in a closed space.
Figure 4:
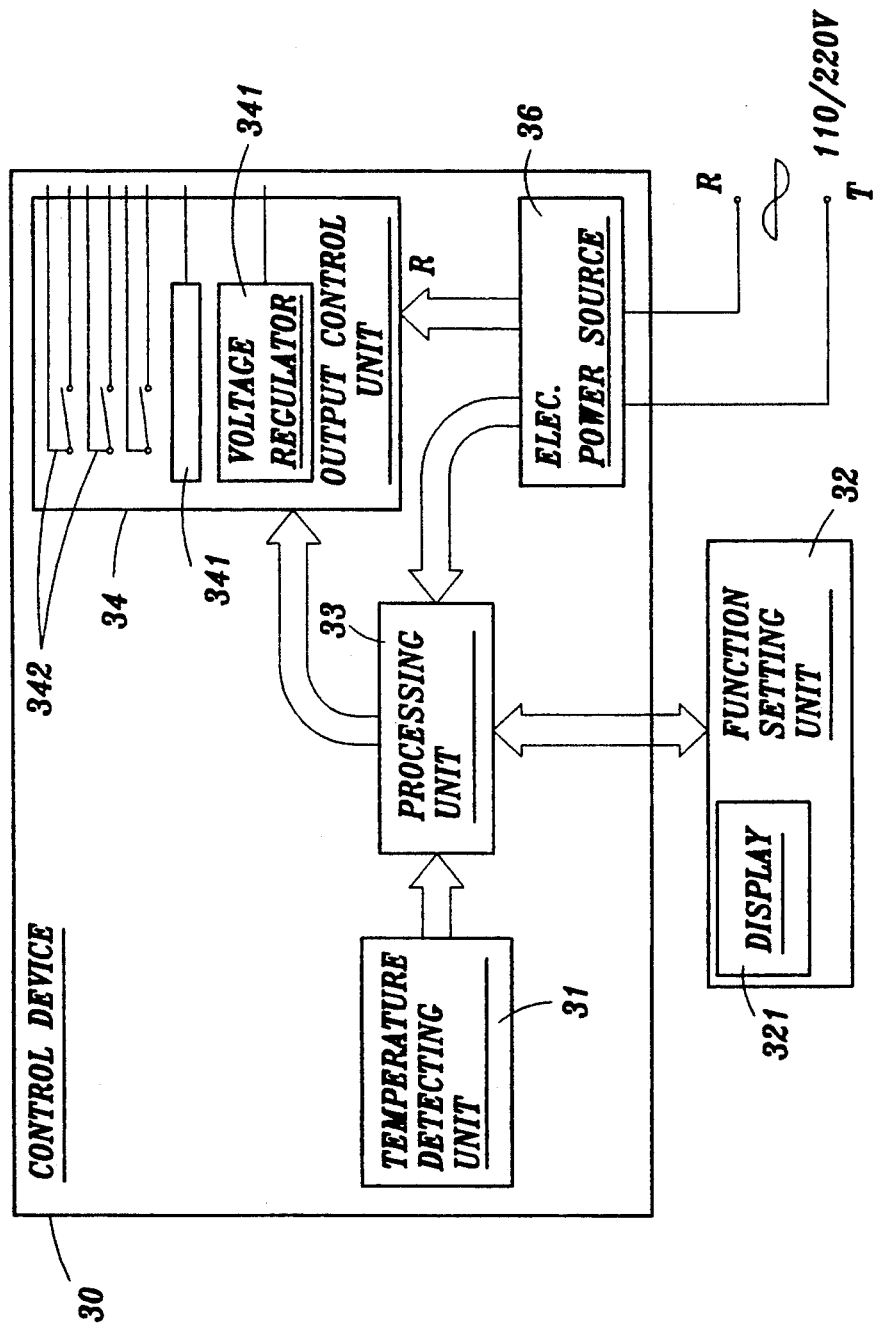
FIG. 4 is a diagram showing the arrangement of the present air conditioning system.
Figure 5:
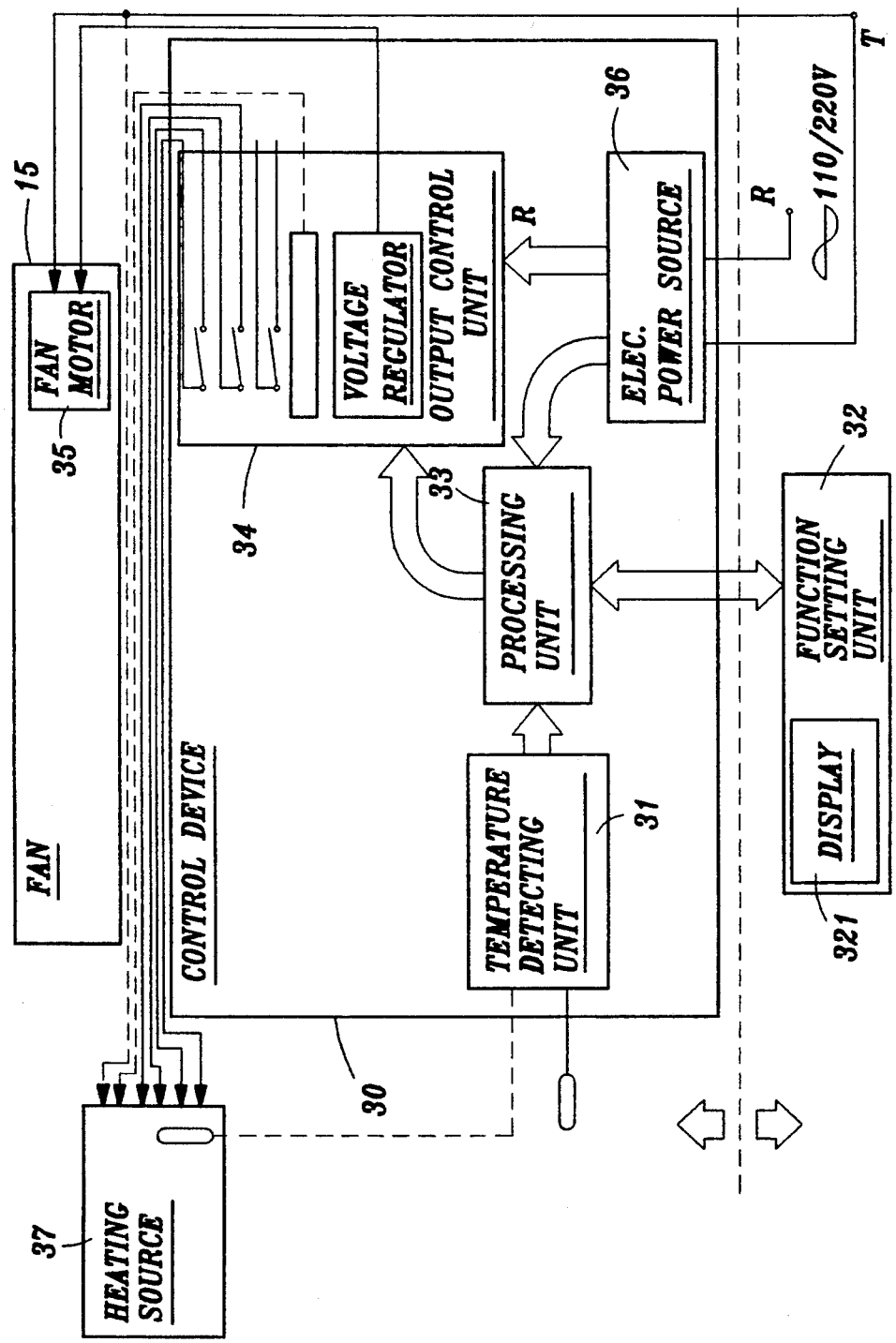
FIG. 5 is an embodiment of the present invention.

Referring to FIGS. 4, 5, the control device 30 of the present invention comprises a function setting unit 32, a temperature detecting unit 31, a processing unit 33, an output control unit 34, and a power supply unit 36.

The temperature detecting unit 31 has more than one temperature sensing components 311 disposed at different spots in the closed space 10 for detection of various temperatures thereat and the temperatures of various components of the heating source 37 and the outcomes of the detections are transmitted to the processing unit 33.

The function setting unit 32 is able to set the air conditioning system in a heating or cooling operation mode with the processing unit 33 selecting a proper processing program to follow and input all the predefined control parameters on which the temperature sensing components 311 are intended to monitor therein so that the processing unit 33 can accordingly work on the parameters. A display 321 is used to receive and show data transmitted from the processing unit 33 in reference to the condition of the closed space under the influence of the present air conditioning system or the temperature variations of other systems (such as the devices in association with a heating source 37, or a cooling water tower 13, etc.).

The processing unit 33 particularly receives control signals from the function setting unit 32 in relation to the the running mode and the target temperature values to be controlled or the other functional inputs; in the meanwhile, the processing unit 33 continuously picks up the practically detected temperatures which are analyzed and compared; after the outcomes of the analytical comparisons are obtained, the processing unit 33 will, under the selected running mode, generate corresponding control signals according to a predefined program that are transmitted to the output control unit 34. Simultaneously, the processing unit 33 will deliver another set of data to the display 321 of the function setting unit 32 so that the condition of temperatures of all parts of the system can be clearly demonstrated accordingly.

The output control unit 34 is comprised of more than one voltage regulators 341 and at least one control connecting point 342 which is an ON/OFF type control switch used to control the start and stop of a refrigerator, or a boiler or the opening and closing of an electrical water valve, and etc.. The voltage regulator 341 is made up of a Diac 343 and an automatic wave rectifier 344 and is also provided with an overload protection device.

Figure 6:
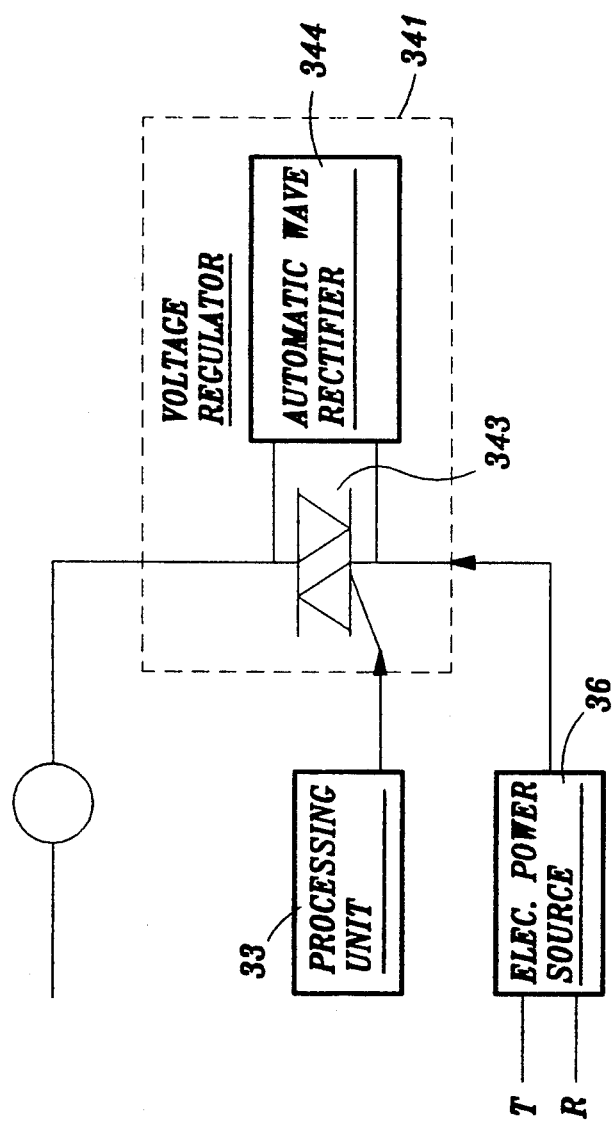
FIG. 6 is a diagram showing the structure of the voltage regulator of the present invention.

Referring to FIG. 6, the wave shape of the output electric voltage of the Diac 343 is rectified automatically by the automatic wave rectifier 344 whereby the voltage wave shape supplied to the fan motor 35 by an alternating electric source can be mained symmetric; thus, not only the problems caused by the harmonic waves in the fan motor can be improved, but the use of the Diac 343 can control the effective voltage supplied to the fan motor 35 and other devices by the alternating electric source. To the fan motor 35, the adjustment caused by the variation of the supplied voltage enables the same to be operable between a speed of zero to a speed at its full capacity in a stageless manner.

An electric power source 36 is responsible for supply of direct current to the above cited units and supply of alternating current to the voltage regulator 341.

Figure 7:
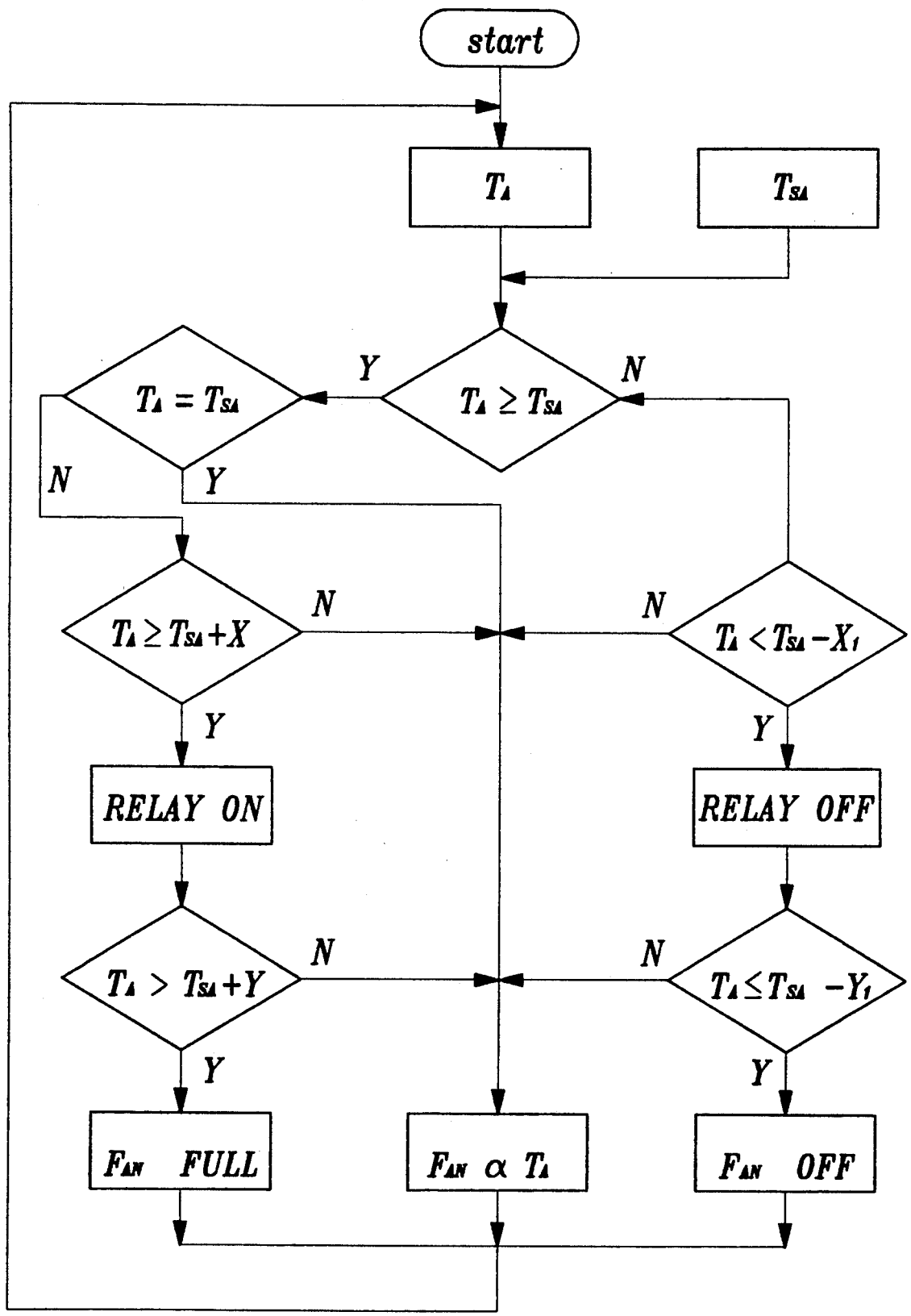
FIG. 7 is a flow chart of the operation procedure of the present air conditioning system in a cooling mode.

As shown in FIG. 5, a practical embodiment of the present invention is illustrated. A set of voltage regulator 341 of the output control unit 34 is connected to the fan motor 35 and another voltage regulator can be coupled to a heating source 37; and a pair of control connecting points 342 are used to remotely control the switching between hot and cold water and the start and stop of a refrigerator or a boiler. The respective temperature sensing components 311 of the temperature detecting unit 31 are connected to a refrigerator, a boiler, a cool water pump, a hot water pump and etc. in relation to the heating source 37, and another temperature sensing component 311 is disposed at a position in a closed space under air conditioning where the room temperature is best detected so that the temperature variations therein can all be detected;

For convenience of explanation of the operation of the system running in a cooling and heating mode, FIG. 5 is used for an instance. The motor running speed Fs, air conditioned space temperature TA and the heating source 37 are interrelated to each other as follows; 1. Running in a cooling mode, referring to FIG. 7, wherein TA: the detected temperature of a space under air conditioning;
TSA: a preset temperature for the air conditioned space;
X: a first preset temperature in the program of the processing unit; $X \geq 0$
X1: a second preset temperature in the program of the processing unit; $X1 \geq 0$
Y: a third preset temperature in the program of the processing unit; $Y \geq 0$
Y1: a fourth preset temperature in the program of the processing unit; $Y1 \geq 0$
RELAY ON: the refrigerator begins a cooling operation (or the electric water valve is opened)
RELAY OFF: the refrigerator stops the cooling operation (or the electric water valve is closed)
FAN FULL: the fan operates at full speed;
FAN OFF: the fan stops;
FAN$\alpha$TA: the operation speed of the fan is in positive proportion to the temperature of the air conditioned space;

In this running mode, the heating source is replaced by a refrigerator; after the function setting unit has completed all the necessary settings, it will send a starting signal to instruct the processing unit to start a continuous picking up of the detected temperatures obtained by the temperature detecting unit that are analytically compared with the preset temperatures; and any outcome of a comparison will make the processing unit send a control signal to the output control unit so that the voltage regulator thereof will work to vary the speed of the fan motor by way of adjustment of the voltage, resulting in the control of the air volume supplied by the fan.

Figure 8:
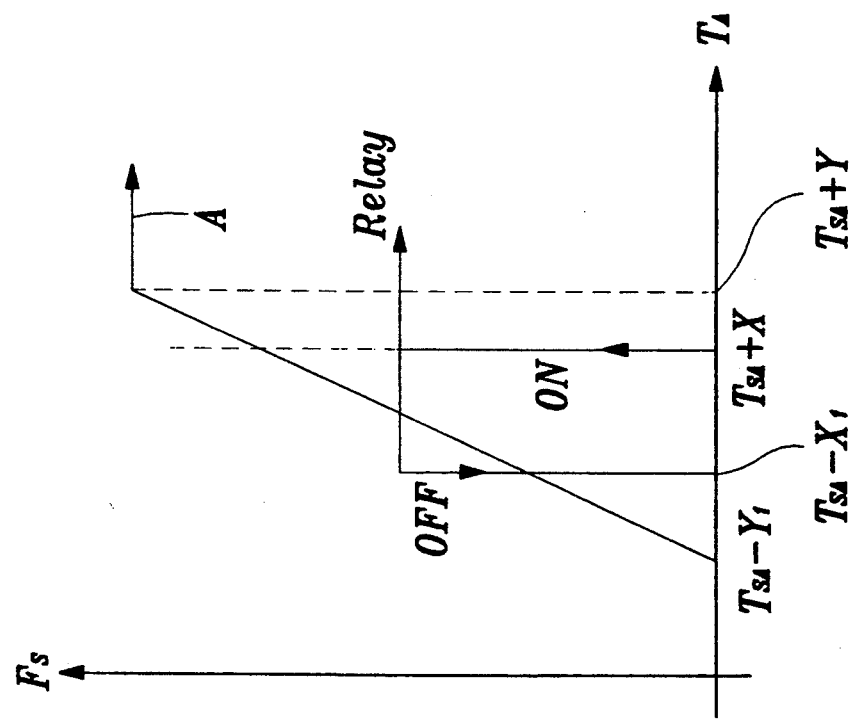
FIG. 8 is a diagram showing the relation among the operation speed of the motor of a fan and the status of the on-off of the refrigerator (RELAY ON-OFF) and the temperature of the closed space subject to a cooling condition.

As shown in FIG. 8, in this running mode, the speed of the fan motor is expressed in a function of the temperature of an air conditioned space by a curve A.

Figure 9:
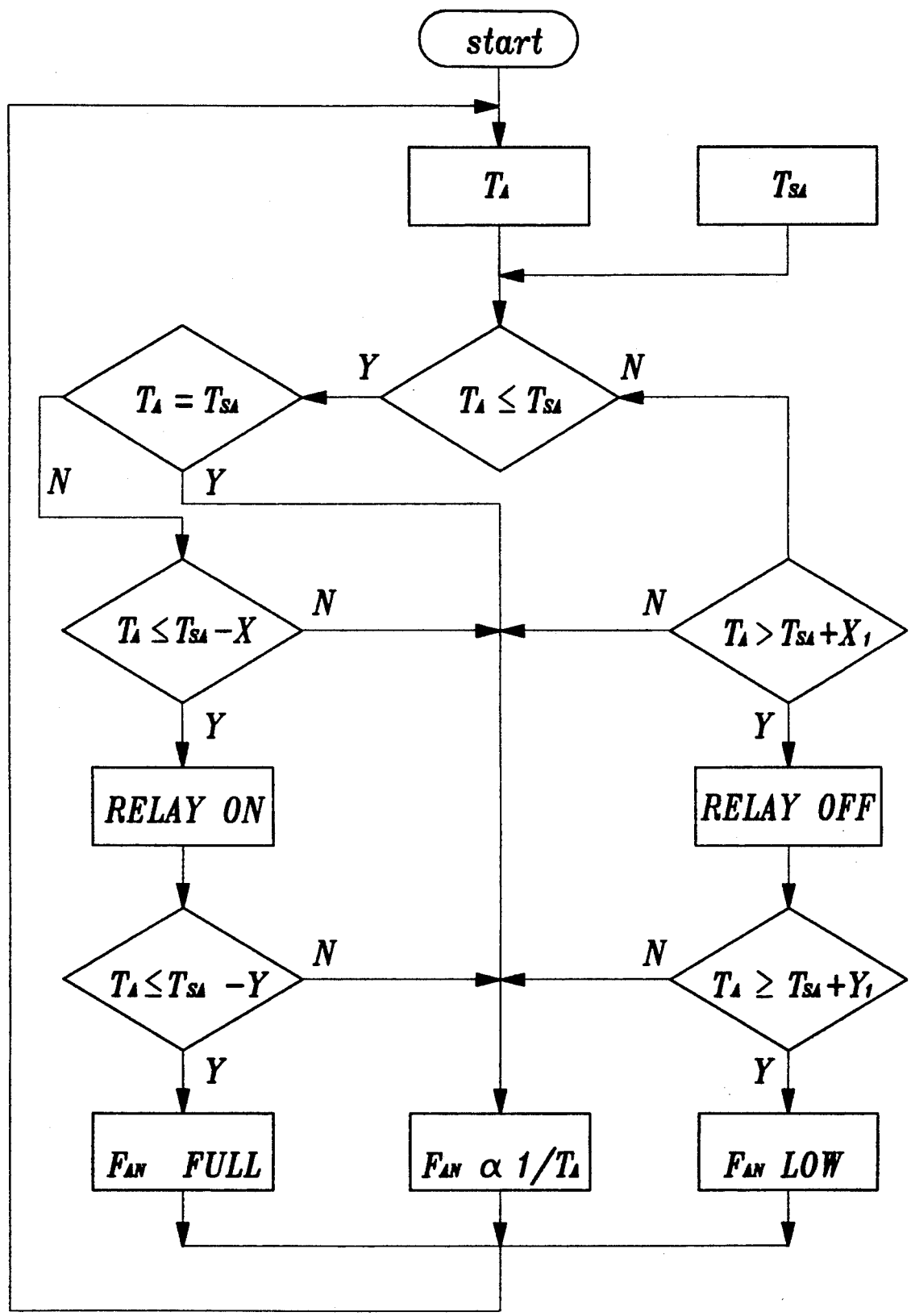
FIG. 9 is a flow chart of the operation procedure of the present invention in a heating mode.

If $TA < TSA - X1$, the refrigerator will not be actuated at all, and only the fan motor is operated at low speed so as to make the closed space ventilated and the air filtered. In case that the temperature of the closed space drops continually below (as the outdoor temperature drops in the night) the value, $TA \leq TSA - Y1$, the fan motor will stop operating; if $TA \geq TSA + X$, the refrigerator starts to function (or the electric water valve is actuated to open), and the speed of the fan motor is accordingly varied so as to effectively lower the temperature of the closed space. When $TA \geq TSA + Y$, this indicates that the temperature of the closed space is too high to be tolerable, the fan motor is actuated to run at its full capacity so as to deliver mass of cooled air into the closed space for quick bringing hot air out thereof till the temperature of the closed space begins to drop. From that point on, the fan motor will vary its operation speed in accordance to the change of the temperature of the closed space. The temperature sensing components constantly provide the processing unit with all the data related to the variation of the temperature of the closed space and the processing unit will deliver the outcome of the comparisons thereof to the output control unit by way of signals so that no matter how frequently the temperature of the closed space is varied, the present invention can always respond properly by stageless variation of the speed of the fan motor in collaboration with the starting or stopping of the refrigerator (or the opening or closing of an electric water valve) whereby the temperature of the closed space can be adjusted in a linear manner. This constitutes the major feature of the present invention. 2. Running in a heating mode, as shown in FIG. 9, wherein T A: the practical detected temperature of the closed space;

T SA: the preset temperature of the closed space under air conditioning;

X: a first preset temperature in the program of the processing unit; $X \geq 0$

X 1: a second preset temperature in the program of the processing unit; $X1 \geq 0$ Y: a third preset temperature in the program of the processing unit; $Y \geq 0$ Y 1: a fourth preset temperature in the program of the processing unit; $Y1 \geq 0$ RELAY ON: a heat pump or a boiler is actuated to provide heat;

RELAY OFF: the heat pump or the boiler is stopped operating;

FAN FULL: the fan operates at full speed;

FAN LOW: the fan operates at a low speed;

FAN $\propto 1/T A$: the fan speed is in a reverse proportion to the temperature of the closed space under air conditioning;

Running in this mode, the heat source equipment can be a boiler or a heat pump. After the function setting unit has completed all the required settings, it will send out a starting signal and the processing unit begins to pick up the detected temperatures from the temperature detecting units which are compared with the preset temperatures; the outcome of the comparisons will make the processing unit transmit a control signal to the output control unit which will actuate the the voltage regulator thereof so as to vary the speed of the fan motor by variation of the electric voltage thereof, resulting in the change of the air volume of the ventilation.

Figure 10:
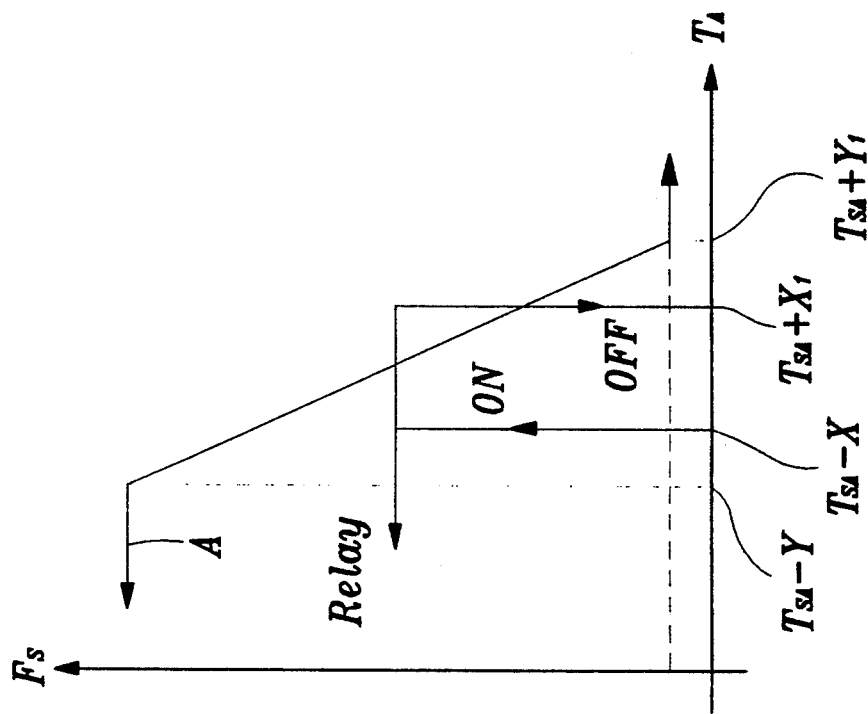
FIG. 10 is a diagram showing the relation among the operation speed of the motor of a fan and the ON-OFF status of a boiler (RELAY ON-OFF) and the temperature of the closed space subjected to a heating condition.

In this running mode, the speed of the fan motor is expressed in function of the temperature of the closed space under air conditioning by a curve A in FIG. 10. In case T A>T SA+X 1, the boiler will not produce any heat, and the fan motor only operates at a low speed to keep the air in good circulation and filtered in addition. In case that the temperature of the closed space, T A$\geq$T SA+Y 1, as a result of the rise of the external temperature, the fan motor will keep running at a low speed so as to prevent the closed space from being hot and oppressive. In case T A$\leq$T SA−X the boiler (or the electric water valve) begins to operate in collaboration with the adjustment of the speed of the fan motor so that the temperature of the closed space can be varied accordingly. As the temperature of the closed space continues to drop to such a state that T A$\leq$T SA−Y, this indicates that the closed space is rather cold, at this instant the fan motor will run at its full speed so as to deliver maximum of heat to the closed space and make the temperature of the same lifted in a short time. This operation will maintain till the rise of the temperature; afterwards, the fan motor will vary its speed in accordance to the variation of the temperature of the closed space. Since the temperature sensing components of the present invention are providing the processing unit with the variation of the temperature of the closed space, the processing unit will analyze and compare the data and send signals to the output control unit so as to make the whole system correspond properly thereto by way of control of the start and stop of a boiler (or the opening or closing of a water valve) and the stageless variation of the operation speed of the fan motor in reverse relation to the temperature of the closed space. Therefore, the linear adjustment of the temperature of the closed space can be effected.

It can be clearly seen that the present computer controlled air conditioning system can make linear adjustment of the temperature of a closed space under air conditioning by making stageless variation of the operation speed of the fan motor thereof in collaboration with the start or stop of a heating or cooling device, such as a boiler or a refrigerator, so that the temperature of a closed space can be always adjusted properly to such a degree that people staying the closed space can feel comfortable; and the present air conditioning system can operate with electric energy consumption reduced to a minimum.

Figure 11:
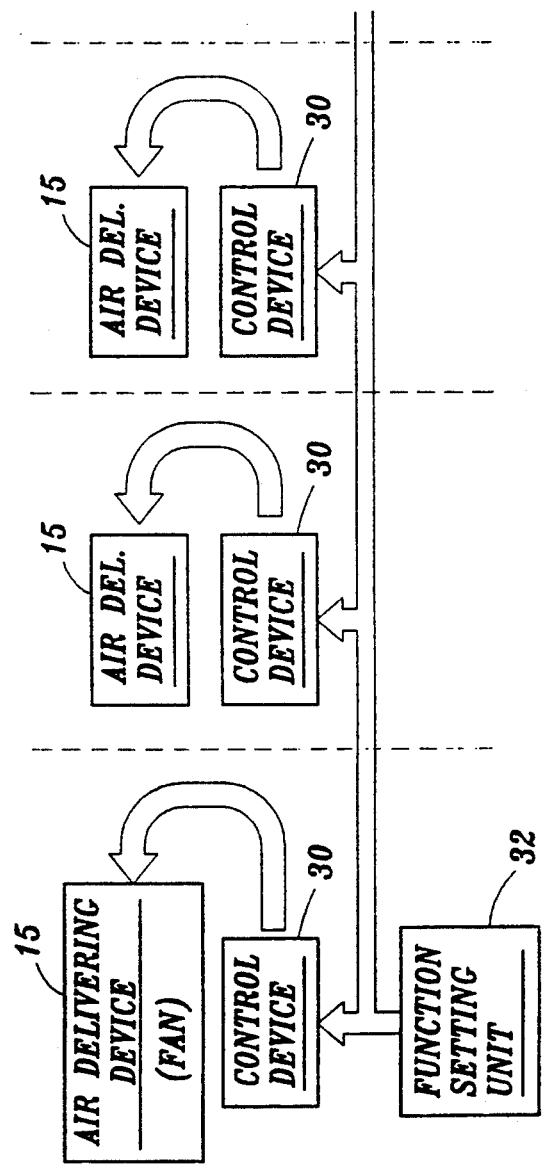
FIG. 11 is a diagram showing the arrangement of the present invention when used in a centrally controlled system.

Referring to FIG. 11, the present invention can use only a function setting unit 32 in cooperation with a a signal transmission line 38 to monitor the control device 30 and the indoor air delivering device 15 disposed in various spots in the closed space under air conditioning so as to form a centrally monitored air conditioning system which can be used in places such as hotels or restaurants and places of like type.

I claim:

1. An improved micro-computer operated control device particularly adapted for an air conditioning system, comprising:

a function setting unit, a temperature detecting unit, a processing unit, an output control unit, and a power supply unit;

said temperature detecting unit including a number of temperature sensing components which are disposed at desired places in functional associated with the system so as to detect the temperatures of a closed space subject to the air conditioning system and the temperatures of the respective heating or cooling means or the temperature of the external environment; and the detected temperatures being transmitted to said processing unit;

said function setting unit being able to set said processing unit into a heating or cooling mode so as to enable said processing unit to select a process program for operation; and preset data all of which in relation to control parameters of said temperature sensing components being able to be input therein to provide information to said processing unit; a displaying means being provided for receiving signals from said processing unit and displaying the temperatures of the respective unit of said air conditioning system;

said processing unit receiving signals from said function setting unit for setting the operation mode of the air conditioning system and preset temperatures to be controlled or the input of other functions and constantly receiving all the detected temperatures from said temperature detecting unit which are analytically compared with said preset temperatures and producing corresponding control signals according to a preset program for a selected operation mode, which are delivered to said output control unit; in the meanwhile said processing unit sending a set of signals to said displaying means of said function setting unit so as to demonstrate the temperature status of respective units of the air conditioning system;

said output control unit including more than one voltage regulators and more than one ON/OFF type control connecting points; said voltage regulator being made up of a wave shaping rectifier and a Diac with an overload protection means attached therewith whereby the voltage supplied to a fan motor and additional electric means by an alternating power source is free of harmonic interference in one aspect and enable the voltage thereof to be adjusted in a stageless manner from zero to a full capacity;

said power supply unit providing a direct current power source to said units and an alternating current power source to said voltage regulators.

2. An improved micro-computer operated control device for air conditioning system as claimed in claim 1 wherein one said function setting unit can be associated with a signal transmission line to monitor a control device disposed in each closed space under air conditioning and a fan means so as to form a centrally controlled air conditioning system.

* * * * *